US012242063B2

(12) United States Patent
Porubanova et al.

(10) Patent No.: US 12,242,063 B2
(45) Date of Patent: Mar. 4, 2025

(54) VERTICAL MISALIGNMENT CORRECTION IN BINOCULAR DISPLAY SYSTEMS

(71) Applicant: Microsoft Technology Licensing, LLC, Redmond, WA (US)

(72) Inventors: Michaela Porubanova, Seattle, WA (US); Bjorn Nicolaas Servatius Vlaskamp, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/186,404

(22) Filed: Mar. 20, 2023

(65) Prior Publication Data

US 2024/0319504 A1    Sep. 26, 2024

(51) Int. Cl.
  *G06F 3/01*    (2006.01)
  *G02B 27/00*   (2006.01)
  *G02B 27/01*   (2006.01)

(52) U.S. Cl.
  CPC ..... *G02B 27/0172* (2013.01); *G02B 27/0093* (2013.01); *G02B 2027/0132* (2013.01); *G02B 2027/014* (2013.01); *G02B 2027/0198* (2013.01)

(58) Field of Classification Search
  CPC ............ G02B 27/0172; G02B 27/0093; G02B 2027/0132; G02B 2027/014; G02B 2027/0198; G02B 2027/0129; G02B 2027/0134; G02B 2027/0178; G02B 2027/0181; G06F 3/01; H04N 13/117; H04N 13/383; H04N 13/398; H04N 13/344

See application file for complete search history.

(56) References Cited

U.S. PATENT DOCUMENTS

| 10,321,820 B1 * | 6/2019 | Gollier ............... G02B 27/0172 |
| 10,928,510 B1 * | 2/2021 | Wood .................... G01S 13/867 |
| 10,939,091 B1 * | 3/2021 | Choi .................... H04N 13/239 |
| 2008/0024391 A1 | 1/2008 | Oliver et al. |

(Continued)

OTHER PUBLICATIONS

International Search Report and Written Opinion received for PCT Application No. PCT/US2024/019305, May 16, 2024, 13 pages.

*Primary Examiner* — Jose R Soto Lopez
(74) *Attorney, Agent, or Firm* — Alleman Hall & Tuttle LLP (57) ABSTRACT

Examples are disclosed that relate to systems and methods for correcting vertical misalignment in a binocular display system. One example provides a head-mounted display device, comprising a binocular display system comprising a left eye display and a right eye display, the binocular display system configured to display image content; a display misalignment detection system; and a controller. The controller is configured to receive a signal from the display misalignment detection system comprising information related to a vertical misalignment between the left eye display and the right eye display, analyze the image content to determine image content information, determine a vertical misalignment correction strategy based at least upon the image content information and the vertical misalignment, and based upon the vertical misalignment correction strategy, control the binocular display system to correct the vertical misalignment.

19 Claims, 10 Drawing Sheets

LEFT EYE IMAGE             RIGHT EYE IMAGE

VERTICAL MISALIGNMENT 704    604

604

706

DOUBLE VISION (56) References Cited

U.S. PATENT DOCUMENTS

| | | | |
|---|---|---|---|
| 2010/0103077 A1* | 4/2010 | Sugiyama | G02B 27/0172 |
| | | | 340/425.5 |
| 2013/0038510 A1 | 2/2013 | Brin et al. | |
| 2014/0362180 A1* | 12/2014 | Bickerstaff | H04N 13/344 |
| | | | 348/43 |
| 2016/0117864 A1 | 4/2016 | Cajigas | |
| 2018/0308455 A1* | 10/2018 | Hicks | H04N 19/107 |
| 2018/0357479 A1* | 12/2018 | Swaminathan | G06V 40/28 |
| 2019/0222823 A1* | 7/2019 | Clagg | H04N 7/183 |
| 2019/0238818 A1* | 8/2019 | Held | H04N 13/139 |
| 2019/0258442 A1* | 8/2019 | Hudman | G02B 27/0176 |
| 2019/0324276 A1* | 10/2019 | Edwin | G06V 40/19 |
| 2020/0333609 A1* | 10/2020 | Leister | G03H 1/2205 |
| 2021/0011288 A1* | 1/2021 | Lai | H04N 13/106 |
| 2021/0157144 A1* | 5/2021 | Tominaga | G09G 3/20 |
| 2021/0173474 A1* | 6/2021 | Sztuk | G06T 19/006 |
| 2021/0181840 A1* | 6/2021 | Vlaskamp | G02B 6/0076 |
| 2021/0290053 A1* | 9/2021 | Tran | A61B 3/113 |
| 2021/0314670 A1* | 10/2021 | Atluru | H04N 21/4318 |
| 2022/0387873 A1* | 12/2022 | Hall | A63B 24/0021 |
| 2022/0392111 A1* | 12/2022 | Sztuk | G06F 3/012 |
| 2023/0245603 A1* | 8/2023 | Bavor, Jr. | G09G 3/001 |
| | | | 345/8 |

* cited by examiner

VERTICAL MISALIGNMENT CORRECTION IN BINOCULAR DISPLAY SYSTEMS

BACKGROUND

Head-mounted display systems for displaying virtual reality (VR) and augmented reality (AR) content can include separate left eye and right eye display components. The separate display components can display left eye and right eye images from different perspectives to provide a stereoscopic viewing experience for the user. Human vision systems fuse the different images, enabling the user to perceive displayed content as three-dimensional images at controllable depths in a scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to systems and methods for correcting vertical misalignment in a binocular display system. One example provides a head-mounted display device. The head-mounted display device comprises a binocular display system comprising a left eye display and a right eye display, a display misalignment detection system, and a controller. The controller is configured to receive a signal from the display misalignment detection system comprising information related to a vertical misalignment between the left eye display and the right eye display. The controller is further configured to analyze the image content to determine image content information, determine a vertical misalignment correction strategy based at least upon the image content information and the vertical misalignment, and based upon the vertical misalignment correction strategy, control the binocular display system to correct the vertical misalignment.

DETAILED DESCRIPTION

As mentioned above, head-mounted display (HMD) devices can comprise binocular display systems that include separate left eye and right eye display components. The separate left eye and right eye display components can be used to present stereoscopic left and right eye images of virtual objects. The human vision system can fuse the left and right eye images that appear as three-dimensional images at a specific distance from a viewer.

However, misalignments of the left and right eye displays can occur in HMD systems. This can occur due to software and/or hardware issues. Some examples of software issues that can cause vertical display misalignment include inaccurate placement of the virtual display content during rendering or inaccurate rendering camera positioning. Some examples of hardware issues that can cause vertical display misalignment include deformations due to differential thermal expansion and deformations due to mechanical impacts causing the displays to become misaligned.

Binocular vertical display misalignment can impact a user experience in various ways. For example, binocular vertical display misalignment can cause users to misperceive a virtual object's size and/or location in space. Further, in some instances, human vision systems may not fuse the left eye and right eye images, resulting in users experiencing blurred or double vision (diplopia). Vertical fusional amplitudes, or the amount of vertical retinal disparity between a left eye image and a right eye image of a virtual object that an observer can tolerate and fuse, can be rather small (e.g., less than 2 degrees) for stereoscopic images presented by an HMD. Further, even vertical fusional amplitudes as small as 1.4 arcminutes can result in user discomfort. As a result, even seemingly small magnitudes of vertical display misalignment can cause the above-described issues.

To help detect and correct for vertical display misalignment, HMDs can include a display misalignment detection system to monitor the vertical display misalignment. As described in more detail below, one or more cameras can be used to image the left eye display and the right eye display, and track respective locations where a left eye image and a right eye image are displayed. The display locations of the left eye image and the right eye image can be corrected based on this tracking. As an example correction, a mapping of each image to respective display hardware pixel rows can be shifted upwardly or downwardly.

However, such corrections may be perceptible to the user depending on a rate of the correction and a relative distance between the virtual content and a real-world background.

For example, a correction can appear as a sudden apparent vertical displacement of a displayed virtual image. Such a correction can disrupt a user experience.

Accordingly, examples are disclosed that relate to correcting vertical misalignment in a binocular display system using a correction strategy determined based upon image content being displayed. Briefly, a vertical fusional amplitude is contingent on the stimulus size of virtual objects in the image content. The term stimulus size represents an apparent angular magnitude of an object in a field of view of a user. Vertical fusional amplitudes change based on the stimulus size of an object towards which a user is gazing. The vertical fusional amplitude is relatively smaller for smaller stimulus sizes, and relatively larger for larger stimulus sizes. Thus, the disclosed examples provide for analyzing the image content displayed via the binocular display system to determine a stimulus size of one or more virtual objects. Then, a vertical misalignment correction strategy is determined based upon the stimulus size and the vertical misalignment.

In some examples, the vertical misalignment correction strategy is determined based upon virtual image content in a foveal view region. The foveal view region represents a portion of a field of view that falls on the user's fovea, which is a region of the retina with a highest visual acuity. Using a foveal view region can help in determining an appropriate vertical misalignment correction strategy based upon a virtual object of user focus in instances where multiple virtual objects are present. In some examples, vertical misalignment is corrected quickly based on a relatively smaller stimulus size. This may help improve acute discomfort and help avoid blurred vision and double vision. Further, in some examples, vertical misalignment is correctly relatively slowly based on a relatively larger stimulus size. This may help avoid perceptible image movement while performing a correction. In still further examples, it may be determined not to correct a vertical misalignment due to a relatively large stimulus size. This may help avoid disruptions to a user experience. By determining stimulus size based on image content, the vertical misalignment correction can be performed without user input.

Figure 1:
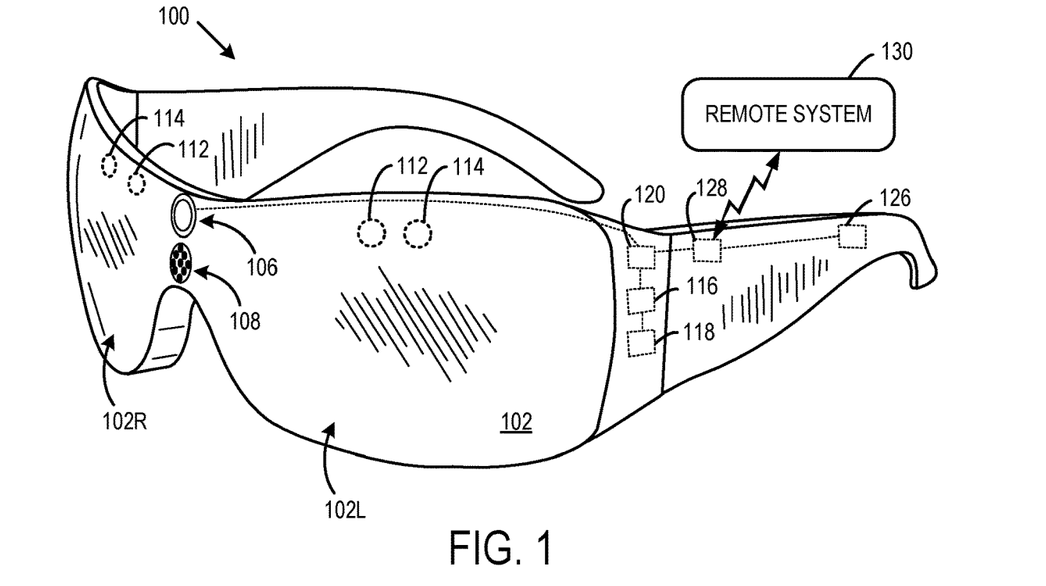
FIG. 1 shows an example of a head-mounted display (HMD) device.

Prior to discussing these examples in detail, FIG. 1 shows an example computing system in the form of a head-mounted display device 100 comprising a binocular display system 102. Binocular display system 102 comprises a left eye display 102L and a right eye display 102R. Each display can comprise a scanned beam projector, a microdisplay (such as LCoS, OLED), or other suitable image display mechanism. Each image can be delivered to a respective eye using any suitable optics. Example optics include one or more lens(es), waveguide(s), a prism(s), and combinations thereof. Images displayed on left eye display 102L and right eye display 102R can comprise stereoscopic images of virtual objects. In AR applications, including MR applications, the images of virtual objects are overlayed on the real-world scene such that the virtual objects appear to be present in the real-world scene. In VR applications, display device 100 may instead comprise features to hide the real-world scene from view of the user.

Display device 100 comprises an outward-facing camera system, depicted schematically at 106. The outward facing camera system 106 may comprise one or more of a depth camera system (e.g., time-of-flight camera, structured light camera, or stereo camera arrangement), an intensity camera (RGB, grayscale, or infrared), and/or other suitable imaging device. Imagery from outward-facing camera system 106 can be used to form a map of an environment. As a more specific example, raw depth data from depth images of different regions of the use environment can be used to construct a point cloud depth representation of the use environment. This point cloud representation then may be used to form a surface reconstruction of the environment.

Outward-facing camera system 106 may also capture user hand motion, and thus may be used for gesture inputs. Display device 100 optionally comprises an acoustic receiver 108, such as a microphone or microphone array, configured to receive audio inputs, such as speech inputs from the user.

Display device 100 also comprises, for each eye, one or more eye-tracking cameras 112 and one or more glint light sources, illustrated schematically at 114. Each glint light source 114 is configured to direct light (e.g. infrared light) toward the cornea of a user's eye. Image data from each eye-tracking camera is analyzed to determine the location of a glint from each glint light source and a location of the pupil of the eye. The glint and pupil location data may then be used to determine a gaze direction, potentially in combination with suitable anatomical models related, for example, to eye geometry and/or head geometry. In the depicted example, the glint light source(s) 114 and corresponding eye-tracking camera 112 are schematically depicted as being positioned above the eye. In other examples, the eye-tracking camera and glint light sources may be positioned below the eye, to a side of the eye, or in any other suitable location.

Display device 100 further may comprise a global positioning system 116 and one or more motion sensors 118. Global positioning system 116 may be used to determine a user's location. Motion sensor data from motion sensor 118 may be used to track changes in the position and orientation of the display device 100 on the user's head and/or in the use environment. Display device 100 may also comprise an audio output device 126 comprising one or more speakers configured to output audio content to the user. In some examples, a speaker may be positioned near each ear. In other examples, display device 100 may connect to external speakers, such as ear buds or headphones.

Display device 100 also comprises a controller 120. Controller 120 comprises, among other components, a logic subsystem and a storage subsystem that stores instructions executable by the logic subsystem to control the various functions of display device 100. Examples of such functions are described in more detail below. Display device 100 further comprises a communication subsystem 128 for communicating via a network with one or more remote computing systems 130.

Figure 2:
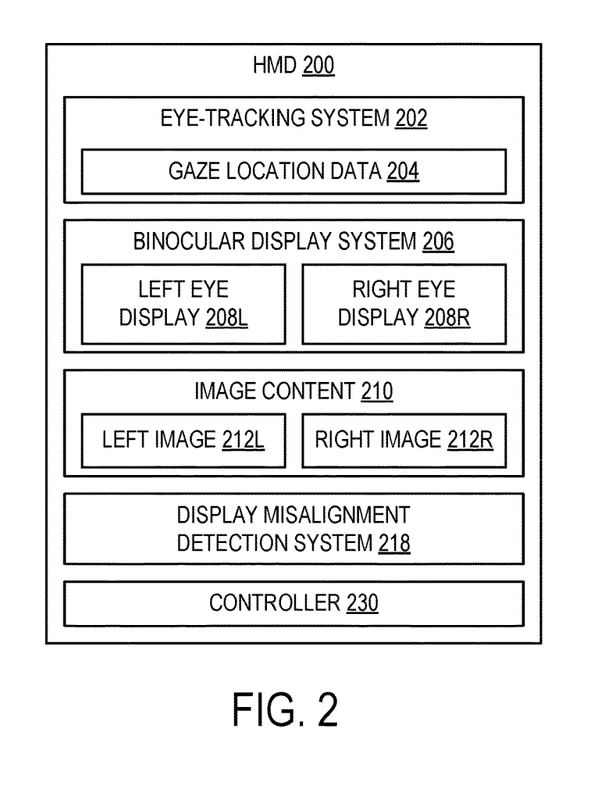
FIG. 2 shows a block diagram of an example HMD device.

FIG. 2 shows a block diagram of an example HMD device 200. HMD device 200 is an example implementation of display device 100. As described above with regard to FIG. 1, HMD device 200 comprises an eye-tracking system 202 configured to track a gaze location of a user. Eye-tracking system 202 comprises one or more glint light sources, and one or more image sensors configured to capture an image of each eye of the user. In some examples, HMD device 200 further includes an inertial measurement unit (IMU) for tracking a user's head gaze to detect an orientation and position of HMD device 200. As such, eye-tracking system 202 can be used to determine gaze location data 204 indicating a location within a scene towards which a user is gazing. As discussed in more detail below, gaze location data 204 also can be used to determine a foveal view region of an image frame and/or determine a virtual object towards which a user is gazing. Gaze location data 204 also can be used to determine a vergence plane for the left eye and right eye of the user. In such examples, the depth of the vergence plane can be determined based on an intersection of a gaze direction of the left eye with a gaze direction of the right eye.

HMD device 200 further comprises a binocular display system 206 for displaying image content to a user. Binocular display system 206 comprises a left eye display 208L and a right eye display 208R to display image content 210 comprising a left image 212L and a right image 212R.

HMD 200 further comprises a display misalignment detection system 218 configured to detect misalignment between image content displayed via left eye display 208L and right eye display 208R. Display misalignment detection system 218 can comprise one or more image sensors. In some examples, display misalignment detection system 218 can utilize images sensors of eye-tracking system 202. In some examples, display misalignment detection system 218 images the left and right eye of a user to determine a location of left image 212L and right image 212R projected on the left and right eyes, respectively. In some examples, display misalignment detection system 218 captures an image of image content displayed on left eye display 208L and right eye display 208R. Display misalignment detection system 218 can output a signal indicating vertical display misalignment and/or horizontal display misalignment to a controller 230. In some examples, display misalignment information is tracked over time and stored in memory.

HMD device 200 optionally comprises a microphone configured to receive audio inputs, such as speech inputs from the user. HMD device 200 further optionally comprises a communication subsystem to communicate with one or more remote computing systems. HMD 200 further comprises controller 230 configured to control functions of HMD 200. Example hardware for controller 230 is discussed below with regard to FIG. 13.

Figure 3:
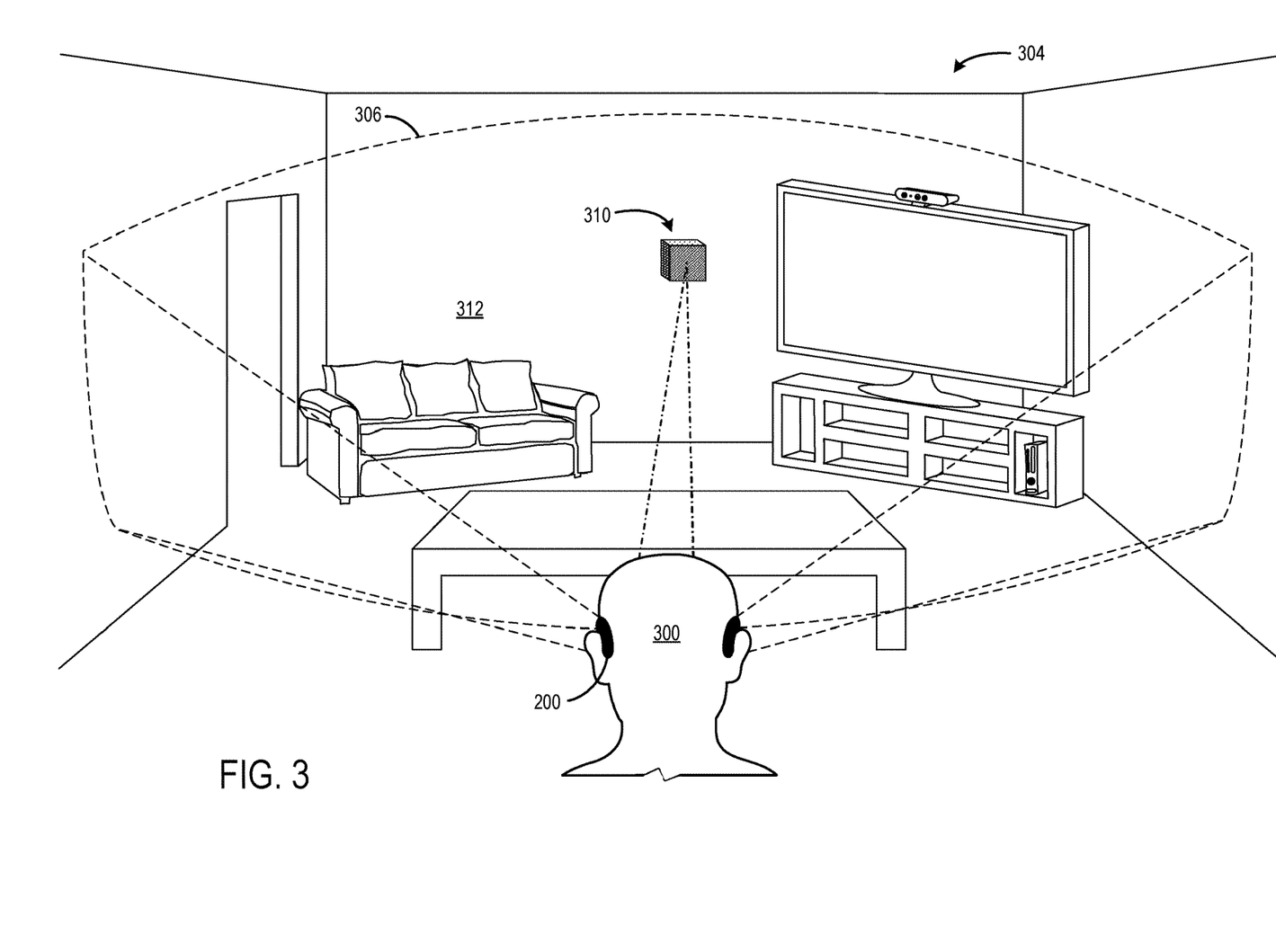
FIG. 3 shows an example scenario in which an HMD displays a virtual object mixed with a real-world scene.

FIG. 3 shows an example scenario in which a user 302 is wearing an HMD device 300. Display device 100 and HMD device 200 are examples of HMD device 300. HMD device 300 comprises a binocular display system (e.g., binocular display system 206 or binocular display system 102) configured to display image content via a left eye display and a right eye display. HMD device 200 is configured as a mixed reality (MR) display device that can display virtual objects realistically mixed with physical objects in a real world background. As such, user 302 can view an MR scene 304 within a field of view 306. In the illustrated example, MR scene 304 includes a virtual object 310 that is viewable against the real-world background 312.

Figure 4:
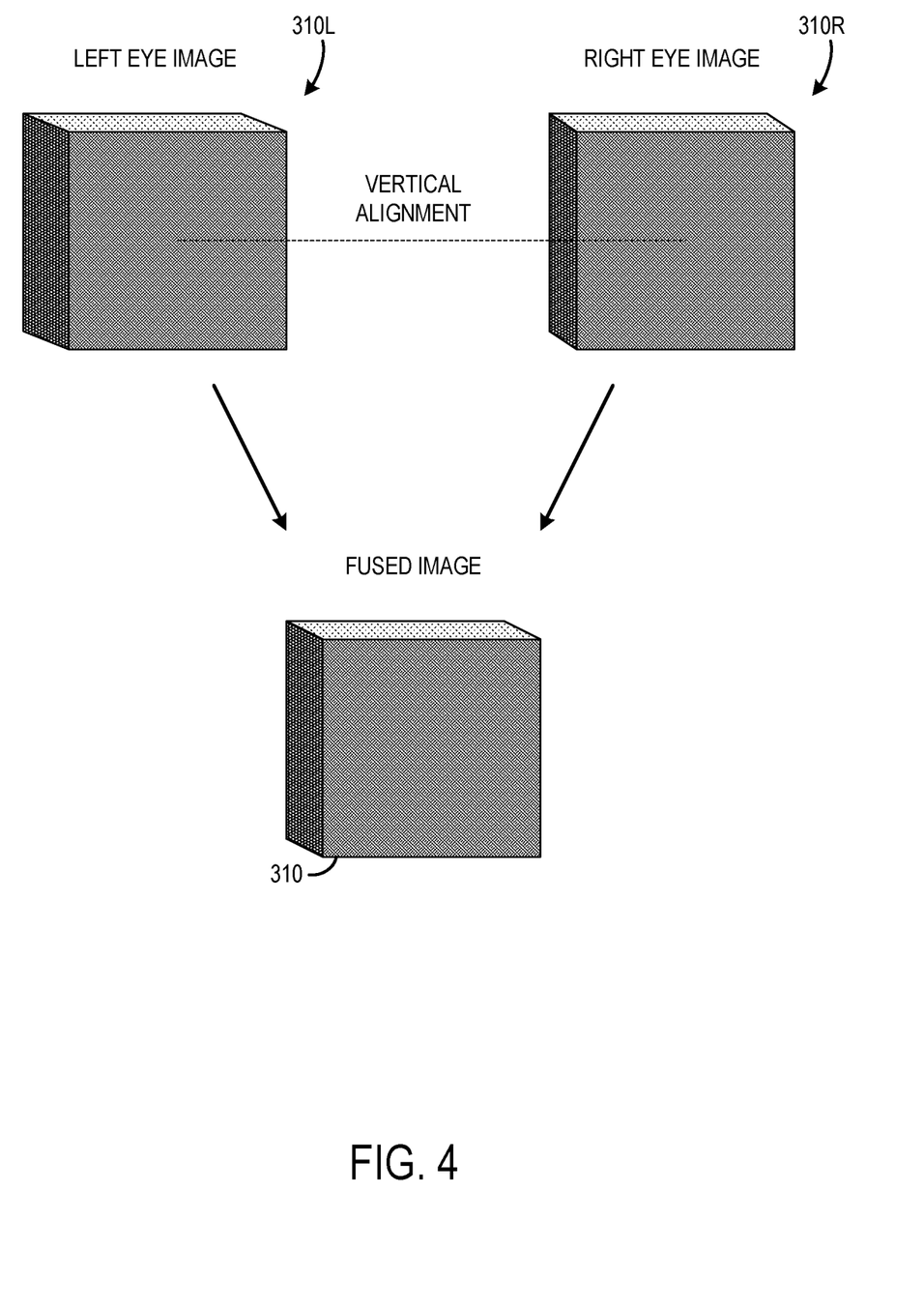
FIG. 4 schematically shows example left eye and right eye images that can be displayed using a binocular display system and that can be fused by a human vision system.

As mentioned above, human vision can fuse stereoscopic left and right images to perceive displayed content at a predetermined depth and/or location within a scene. FIG. 4 schematically shows an example of a left eye image 310L and a right eye image 310R that can be displayed respectively on a left eye display and a right eye display of HMD device 300. Left eye image 310L and right image 310R are fused by the human vision system to present virtual object 310. Left eye image 310L comprises an image of virtual object 310 from the perspective of the left eye of user 300. Likewise, right eye image 310R comprises an image of virtual object 310 from the perspective of the right eye of user 300.

Figure 5:
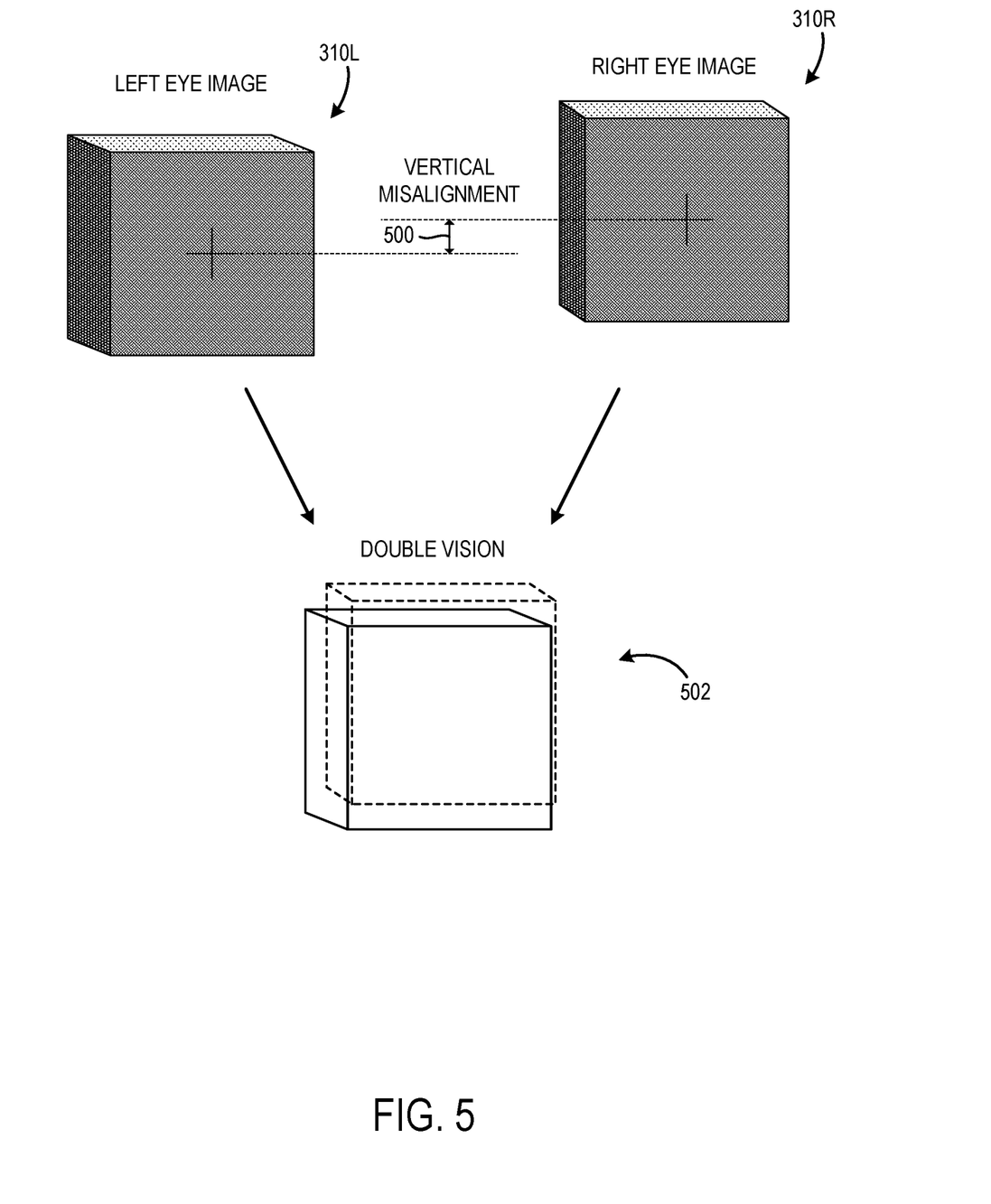
FIG. 5 schematically shows an example of vertical misalignment between the left eye image and the right eye image of FIG. 4 that causes the human vision system not to fuse the images.

FIG. 5 schematically shows an example of vertical misalignment between the left eye image 310L and the right eye image 310R of FIG. 4 that causes the human vision system not to fuse the images. As discussed above, software and/or hardware issues can result in a vertical misalignment 500 between left eye image 310L and right eye image 310R. As a result, user 300 can experience double vision, illustrated schematically at 502. In some examples, vertical misalignment can cause a user to perceive a blurred image.

The capability of a human vision system to properly fuse displayed images can depend on factors including the degree of vertical misalignment and the stimulus size of the image content. When presented with a pair of left eye and right eye images comprising a relatively small vertical misalignment, a user is more likely to fuse the pair of images compared to instances with a relatively large vertical misalignment. However, this capability may vary across different users. Conversely, fusing a pair of images comprising a relatively large vertical misalignment is less likely.

Figure 6:
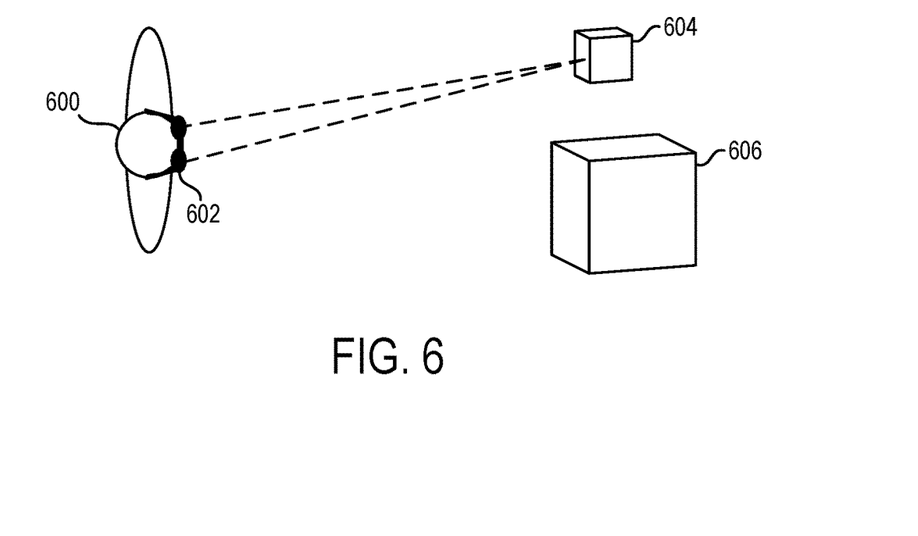
FIG. 6 shows a schematic overhead view of a user gazing towards a smaller virtual object of two virtual objects.
Figure 7:
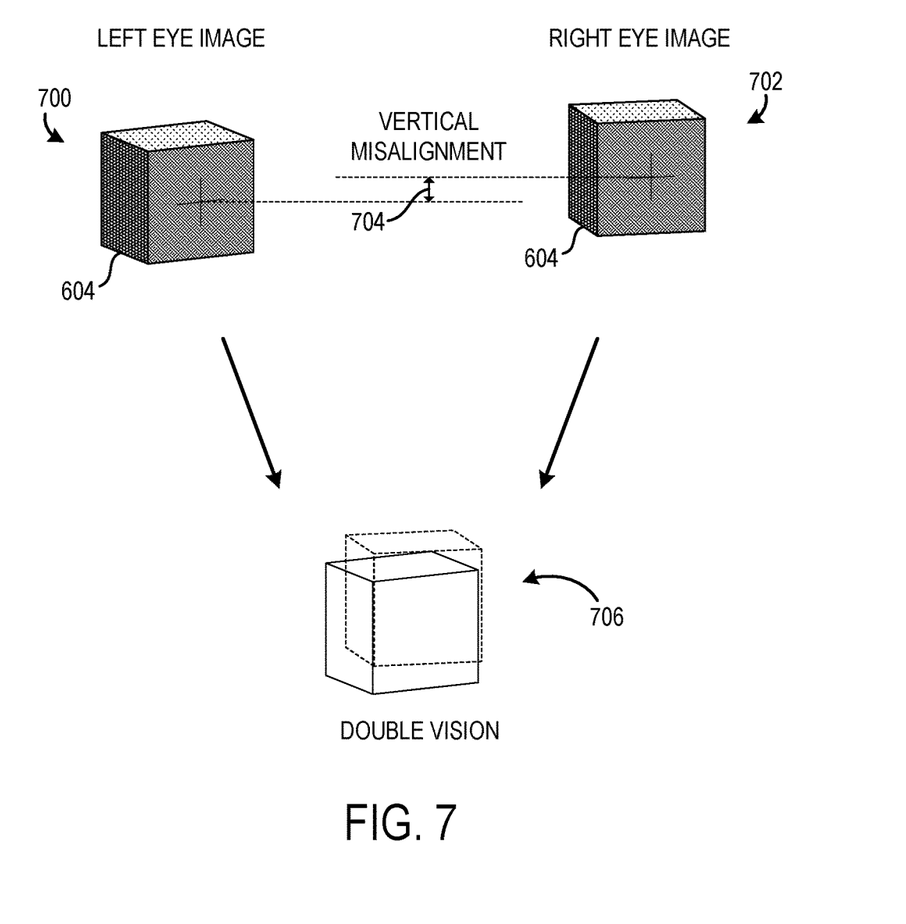
FIG. 7 schematically shows an example of vertical misalignment of a left eye and right eye image of the relatively smaller virtual object of FIG. 6 that causes the human vision system not to fuse the images.

Further, proper image fusion can be less likely at relatively smaller stimulus sizes. FIGS. 6 and 7 schematically show an example of vertical misalignment of image content comprising a relatively smaller stimulus size. FIG. 6 shows a schematic overhead view of a user 600 wearing an HMD device 602. HMD device 602 presents virtual image content to user 600, including a first virtual object 604 and a second virtual object 606 that is relatively larger compared to first virtual object 604. In FIG. 6, user 600 is gazing towards first virtual object 604. As such, user 600 is viewing image content comprising a relatively smaller stimulus size.

FIG. 7 schematically shows a left eye image 700 and right eye image 702 of virtual object 604. The images comprise a vertical misalignment 704. Due to the relatively smaller stimulus size, the vertical misalignment 704 exceeds a vertical fusion amplitude. Thus, user 600 cannot properly fuse left eye image 700 and right eye image 702. This results in double vision, illustrated schematically at 706.

Figure 8:
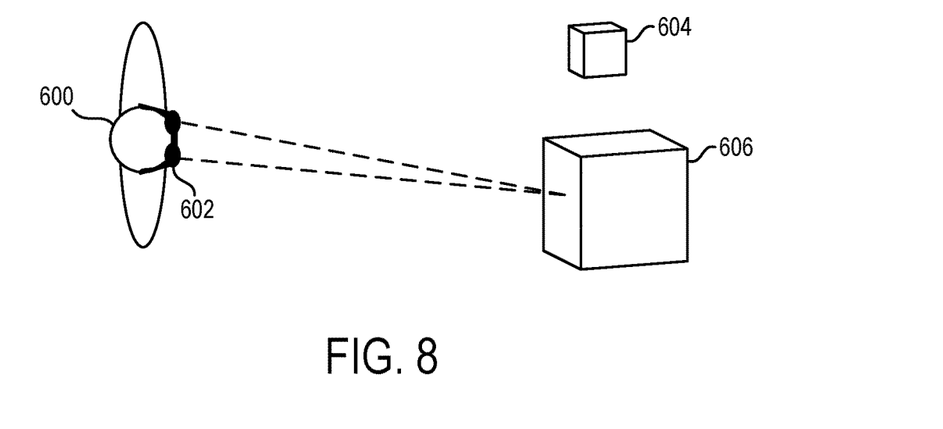
FIG. 8 shows a schematic overhead view of a user gazing towards a larger virtual object of two virtual objects.
Figure 9:
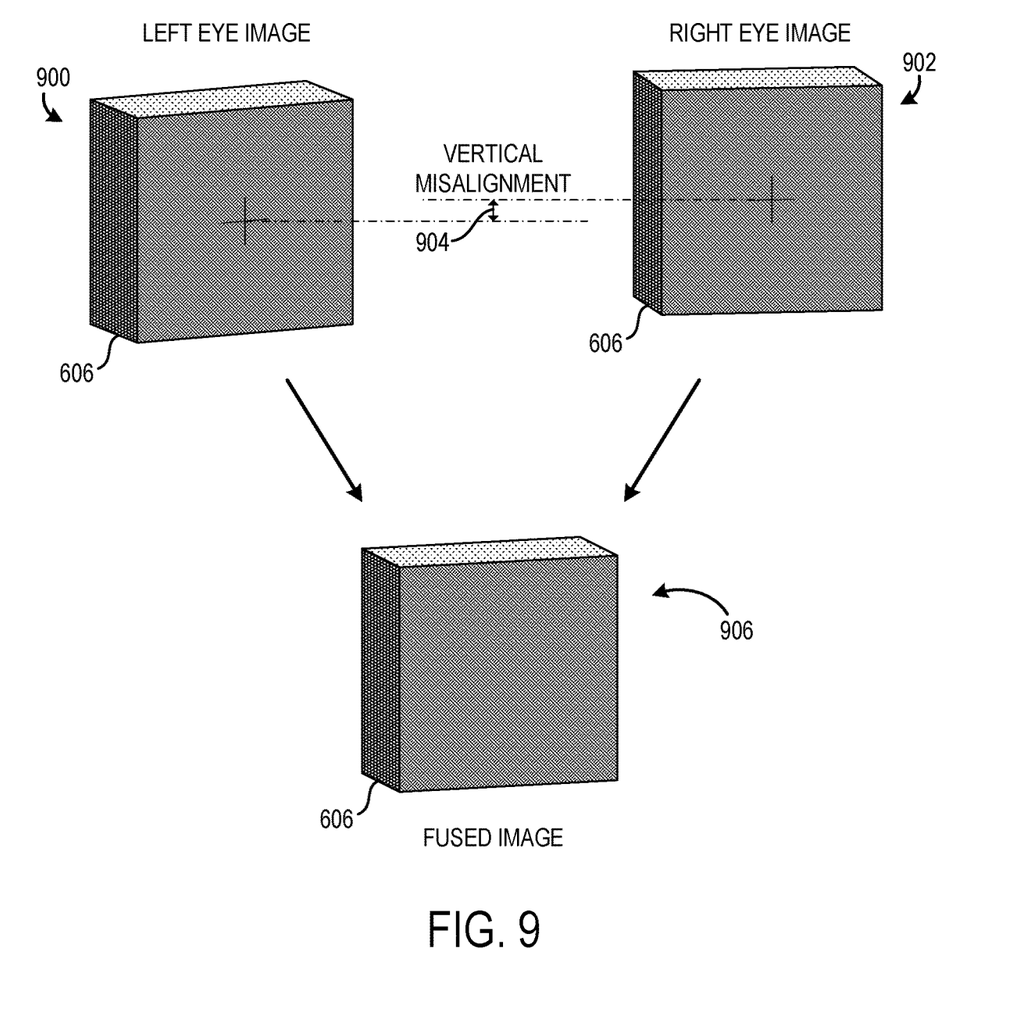
FIG. 9 schematically shows an example of vertical misalignment of a left eye and right eye image of the relatively larger virtual object of FIG. 8 that allows the human vision system to fuse the images.

FIGS. 8 and 9 show another example of vertical misalignment of image content comprising a relatively larger virtual object that does not result in double vision. As illustrated in FIG. 8, user 600 is gazing towards second virtual object 606. As such, user 600 is viewing image content comprising a relatively larger stimulus size. FIG. 9 schematically shows a left eye image 900 and right eye image 902 of virtual object 606. The images comprise a vertical misalignment 904. However, due to the relatively larger stimulus size, vertical misalignment 904 does not exceed a vertical fusion amplitude. Thus, user 600 can fuse left eye image 900 and right eye image 902 into a fused image 906. However, fused image 906 may appear blurred.

As discussed above, a vertical misalignment correction strategy can be determined based upon a stimulus size of one or more objects in the image content. In examples with a relatively smaller stimulus size, such as FIG. 7, a vertical misalignment correction can be performed at a relatively faster rate to reduce a duration of any double vision effect. In some such examples, the vertical misalignment correction can be applied within 1 second or less based on a relatively smaller stimulus size. In some examples, the vertical misalignment correction is applied at a rate of 10 arcminutes per second or greater. In further examples, the vertical misalignment correction can be applied instantaneously.

In examples with a relatively larger stimulus size, such as in FIG. 9, a vertical misalignment correction can be performed relatively slowly to help avoid perceptible corrections that detract from a viewing experience. In some such examples, the vertical misalignment correction is applied within 1 second or greater based on a relatively larger stimulus size. For example, the correction can be applied over 1-3 seconds. In some examples, the vertical misalignment correction is applied at a rate of 1-10 arcminutes per second.

In still further examples, the rate of the vertical misalignment correction can be adjusted based upon detection of saccadic eye movement by the eye-tracking system. For example, eye motion can smoothly track object motion, or can move in quick saccadic motion. Smooth tracking eye motion may indicate that a vertical misalignment correction is being performed at a speed that is comfortable to a user. Further, saccadic motion can indicate a correction that is not being tracked by a user's eyes. This can trigger an adjustment in correction speed to attempt to achieve smooth tracking by the eye.

Image content can be analyzed in any suitable manner. In some examples, image content analysis can be performed after rendering an image frame for display, either prior to display of the image frame, or while the image frame is being displayed. In this manner, analysis can be performed using most recently available information regarding eye-tracking. In such examples, image processing techniques can be used to obtain information about virtual object stimulus sizes. In some examples, an image data frame can be analyzed by determining boundaries of a virtual object using an edge-detecting algorithm. Geometrical analysis can then be performed to measure a size of the virtual object. Further, in some examples, image content can be transformed (e.g., using a Fourier transform) to a spatial frequency domain. Then, the stimulus size can be determined based on a distribution of spatial frequencies in the frequency domain. For example, a smaller image may comprise less low spatial frequency information than a larger image.

Figure 10:
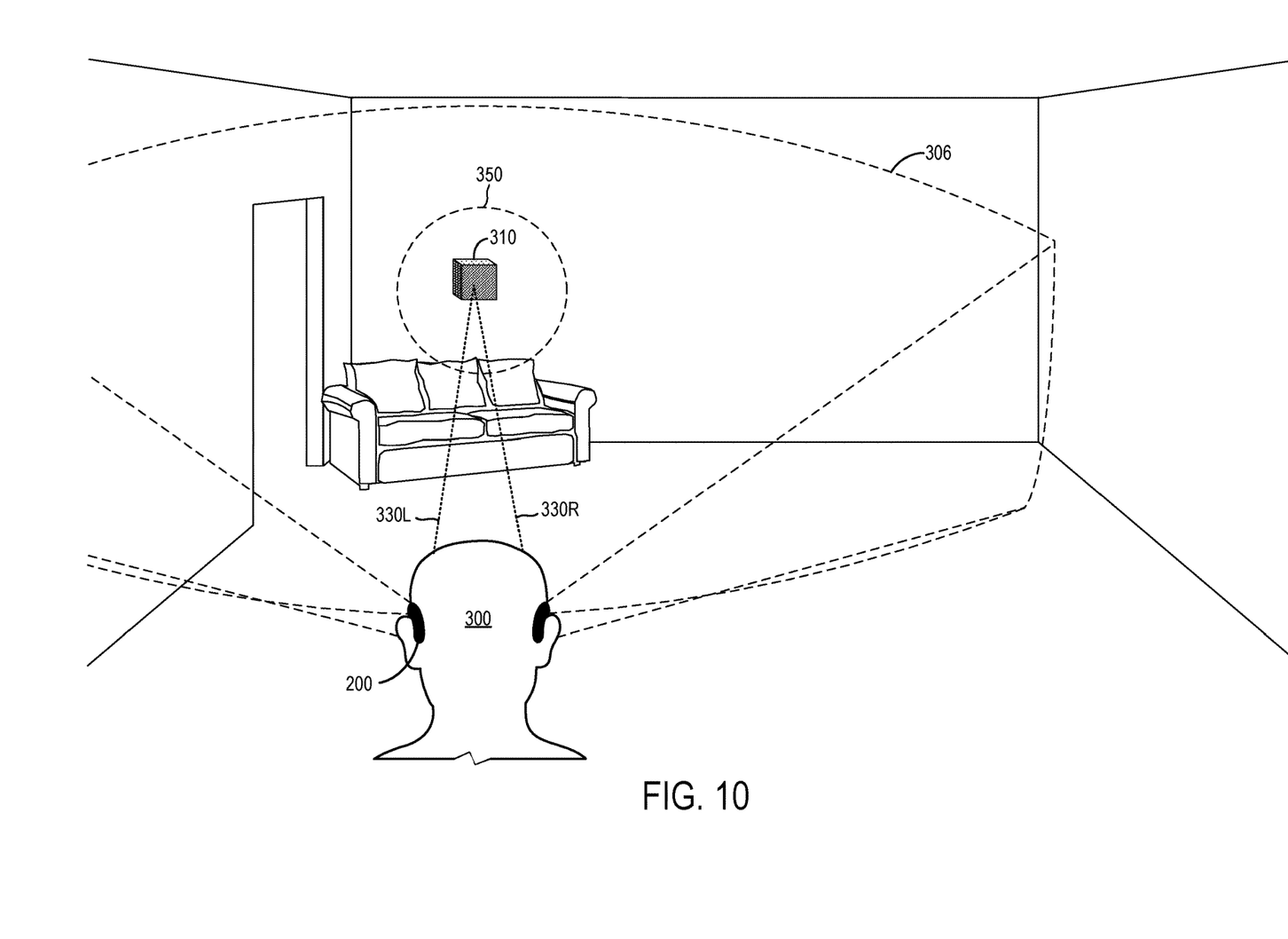
FIG. 10 schematically shows an example foveal view region of an image frame determined based on eye-tracking data.

In some examples, a determination of a relatively smaller stimulus size or a relatively larger stimulus size can be based upon comparing the stimulus size to a threshold value. Any suitable threshold value can be used. In some examples, the threshold value is within a range of 5 to 15 degrees. In various examples, a threshold value can be fixed, or can be adjusted based on user input. In further examples, the threshold is based upon a metric other than actual size data. For example, stimulus size can be analyzed by transforming image data to the spatial frequency domain. In such examples, threshold amounts of frequency information at selected frequencies or within selected frequency bands can be used as a determination of stimulus size for determining a vertical misalignment strategy. In some examples, image data in a foveal view region is used for the stimulus size determination. FIG. 10 schematically illustrates a foveal view region of user 300. The eye-tracking system determines a gaze direction 330L for the left eye and/or a gaze direction 330R for the right eye. Then, a foveal view region 350 is determined based on gaze direction 330L and/or gaze direction 330R. Foveal view region 350 comprises a portion of the field of view 306 of a user around the gaze direction (s). The foveal view region can be represented by a conical region projected from an eye of the user along a respective gaze direction, or from a midpoint between the eyes along an average gaze direction. In some examples, the angle of view of the conical region defining the foveal view region can comprise an angle of 2 to 10 degrees. In some such examples, the foveal view region can be defined by an angle of view of approximately 5 degrees. In other examples, any other suitable angle of view can be used. In some examples, shapes other than a cone can be used to determine a foveal view region (e.g., a rectangular or elliptical cone). As shown in FIG. 10, virtual object 310 is located within foveal view region 350. Thus, the stimulus size of virtual object 310 can be used for determining a vertical misalignment correction strategy. After determining the foveal view region, image content within the foveal view region is analyzed to determine the stimulus size of a virtual object in the foveal view region. In some such examples, image content outside the foveal view region is ignored. Further, in some examples, a vergence plane can be determined based on an intersection of gaze direction 330R and gaze direction 330L. In such examples, image content not at the vergence plane can be filtered out.

In some examples, image content can comprise metadata that indicates a size of one or more virtual objects in the image content. In such examples, the stimulus size for a virtual object can be determined from the metadata for the virtual object. The stimulus size information obtained can be based upon a determined gaze direction intersecting a virtual object being rendered. However, such examples obtain the stimulus size information earlier in a rendering and display pipeline than examples that analyze image content after rendering. Thus, a user's eye may move to a different object prior to completing rendering and display. As such, the correction may be performed on a virtual object at which the user is no longer gazing. As such, analyzing rendered image data to determine a vertical misalignment correction strategy may reduce a risk posed by subsequent eye movement.

Figure 11:
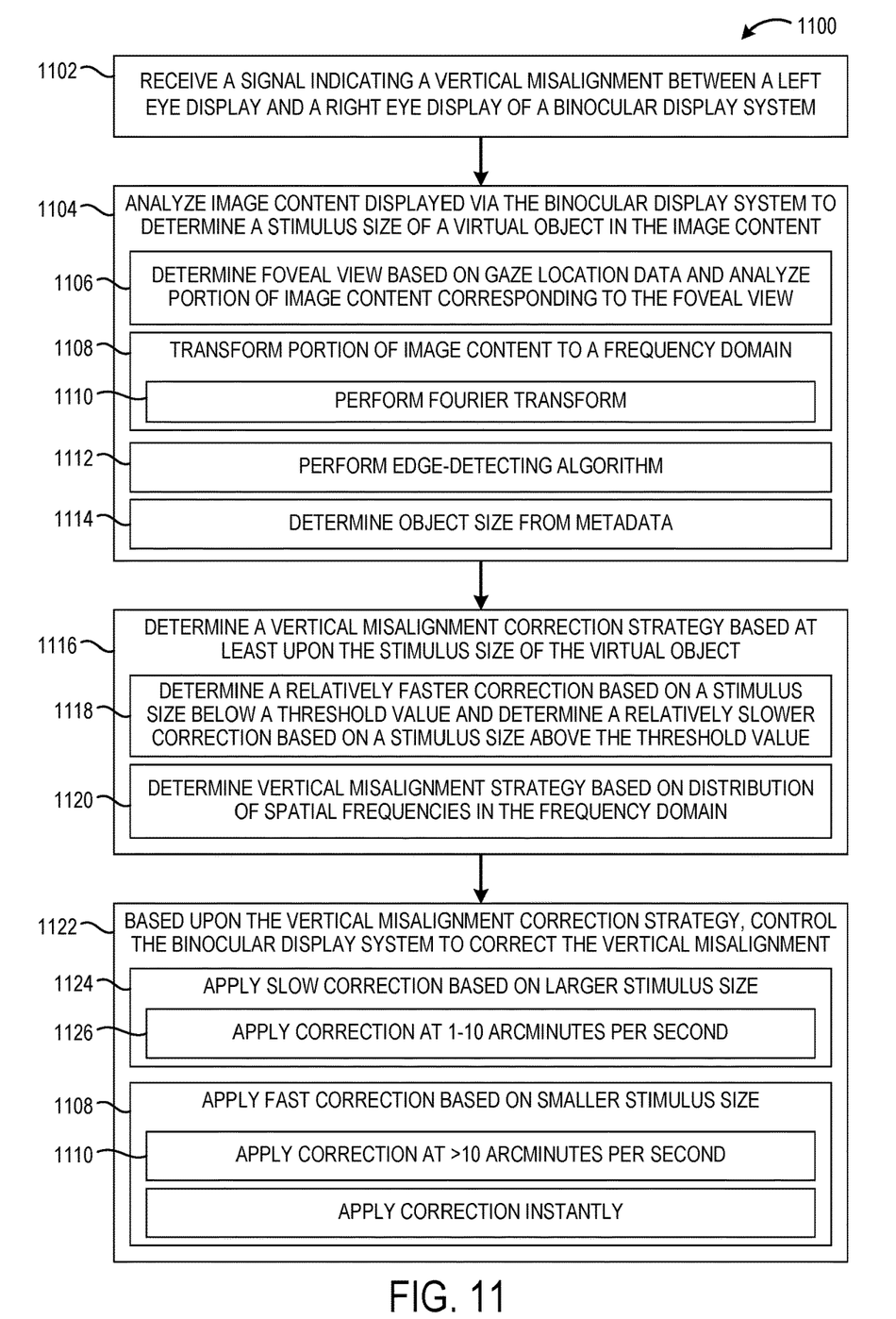
FIG. 11 shows a flow diagram of an example method for determining a vertical misalignment correction strategy based on image content.

FIG. 11 shows a flow diagram of an example method 1100 for performing a vertical misalignment correction for a binocular display system. At 1102, the method comprises receiving a signal indicating a vertical misalignment between a left eye display and a right eye display of a binocular display system. Such a signal may be output by a display misalignment detection system of a display device comprising the binocular display system, for example.

At 1104, method 1100 further comprises analyzing image content displayed via the binocular display system to determine a stimulus size of a virtual object in the image content. In some examples, at 1106, the method comprises determining a foveal view region of a user based on gaze location data, and analyzing a portion of the image content corresponding to the foveal view region to determine the stimulus size of the virtual object.

Continuing, in some examples, at 1108, analyzing the image content comprises transforming at least a portion of the image content to a frequency domain. In some examples, at 1110, a Fourier transform is used to perform the transform. Alternatively or additionally, in some examples, at 1112, analyzing the image content comprises performing an edge-detecting algorithm on an image frame and determining the stimulus size of the virtual object based on a distance between one or more edges. Alternatively or additionally, in some examples, analyzing the image content comprises filtering out image content that is not at a vergence plane.

Further, in some examples, the image content comprises metadata regarding the size of a virtual object in the image content. In such examples, the method comprises, at 1114, determining a size of a virtual object from the image metadata.

Method 1100 further comprises, at 1116, determining a vertical misalignment correction strategy based at least upon the stimulus size of the virtual object. In some examples, at 1118, the method comprises determining a relatively faster correction based on a stimulus size that is below a threshold value. Likewise, at 1118, the method can comprise determining a relatively slower correction based on a stimulus size that is above the threshold value. In some examples (e.g., when 1108 is performed), method 1100 comprises, at 1120, determining the vertical misalignment strategy is based at least upon a distribution of spatial frequencies in the frequency domain.

Continuing, at 1122, method 1100 further comprises, based upon the vertical misalignment strategy, controlling the binocular display system to correct the vertical misalignment. In some examples, at 1124, the method comprises applying a relatively slow correction based on a relatively larger stimulus size. In some examples, at 1126, applying the relatively slower correction comprises applying the correction at a rate of 1-10 arcminutes per second. In some examples, at 1128, the method comprises applying a relatively faster correction based on a relatively smaller stimulus size. In some examples, a relatively slower correction can be applied over 1 to 3 seconds. In still further examples, method 1100 optionally comprises not correcting the vertical misalignment based upon a stimulus size being larger than a threshold value.

In some examples, at 1130, applying the relatively faster correction comprises applying the correction at a rate of 10 arcminutes per second or greater. In some examples, a relatively faster correction can be applied within 1 second or less. In some examples, at 1132, the method comprises applying the correction instantaneously.

Figure 12:
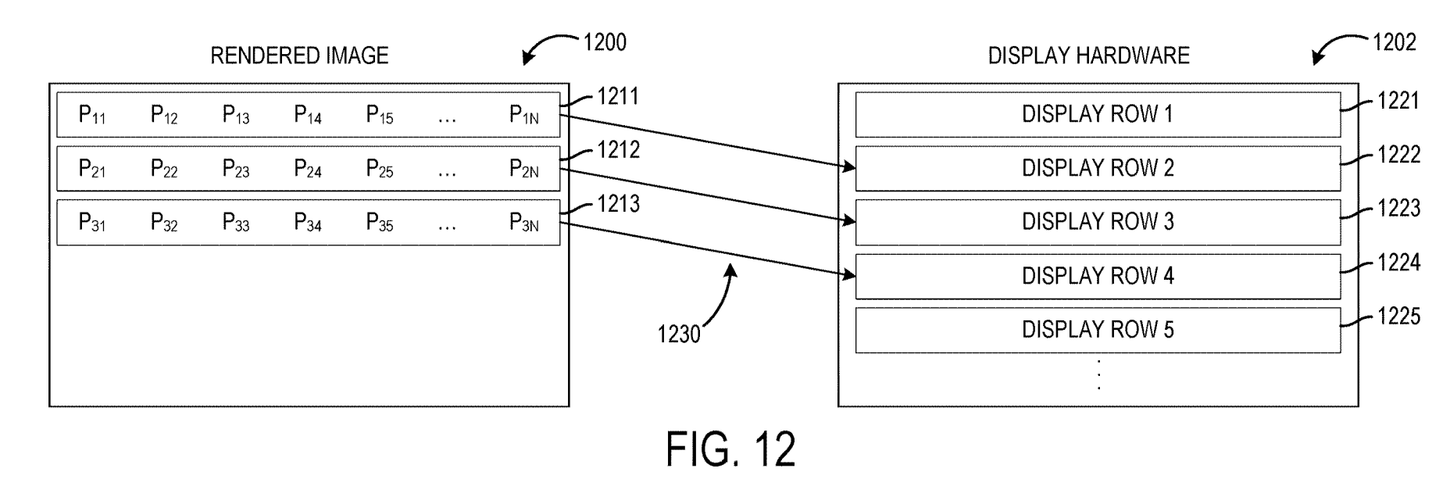
FIG. 12 illustrates an example mapping of rendered pixel data to display hardware.

As mentioned above, in some examples, an HMD device is configured to correct the vertical misalignment by mapping image content to different pixel rows of display hardware. FIG. 12 illustrates an example mapping of rendered image 1200 (e.g. in a frame buffer for display) to display hardware 1202 of a binocular display system. Rendered image 1200 can represent left eye image content or right eye image content, and display hardware 1202 can represent a respective left display or right display of the binocular display system. Rendered image 1200 comprises a plurality of pixel rows including pixel row 1211, 1212, 1213. Each pixel row comprises pixel data (e.g., RGB pixel intensity) for a row of pixels in rendered image 1200 (e.g., pixels $P_{11}$, $P_{12}$, $P_{13}$, $P_{14}$, $P_{15}$, ... $P_{1N}$ of pixel row 1211).

Further, display hardware 1202 comprises a plurality of display rows 1221, 1222, 1223, 1224, 1225. Rendered image 1200 is mapped to display hardware 1202 using mapping 1230. As shown in FIG. 12, pixel row 1211 is mapped to a display row 1222, pixel row 1212 is mapped to a display row 1223, and pixel row 1213 is mapped to a display row 1224. Display hardware can include spare rows at the top and bottom of the array of display rows. Rendered image pixel data is not mapped to these spare rows initially. In the depicted example, display row 1221 is a spare row.

Figure 13:
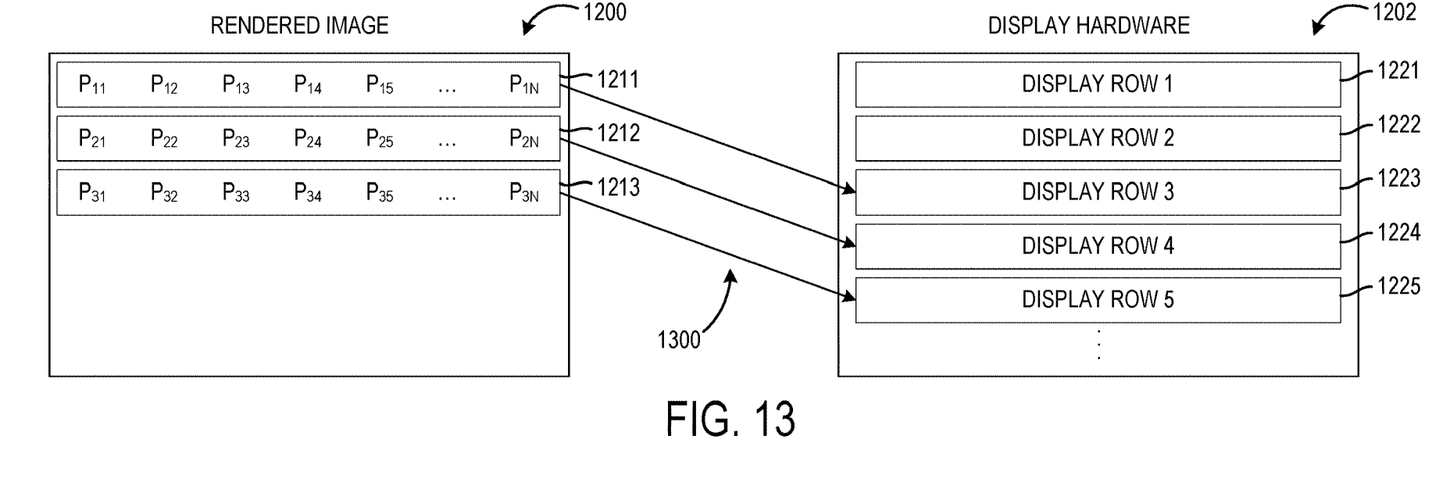
FIG. 13 illustrates another example mapping of rendered pixel data to display hardware following a display alignment correction.

As discussed above, performing a vertical misalignment correction may comprise updating the mapping of a frame buffer to the display hardware. FIG. 13 illustrates such an example where mapping 1230 is updated to an updated mapping 1300 to correct for vertical misalignment of the left eye and right eye displays. In updated mapping 1300, pixel row 1211 is mapped to display row 1223. Additionally, pixel row 1212 is mapped to display row 1224 and pixel row 1213 is mapped to display row 1225. As such, updated mapping 1300 shifts the displayed image vertically downward by one display row in comparison to mapping 1230. The mapping for a left eye image to a left display can be updated independently of a mapping for a right eye image to a right display. In some examples, performing a vertical misalignment correction comprises vertically shifting the displayed left eye image in an opposite direction to a vertical shift of the displayed right eye image. In other examples, the displayed left eye image and displayed right eye image can be shifted a different number of display rows in a same vertical direction. Further, the vertical misalignment correction can comprise shifting multiple rows progressively over multiple image frames. A vertical misalignment correction performed at a relatively faster rate can comprise a greater row shift between successive image frames and/or performing the correction over fewer image frames in comparison to a relatively slower rate. Additionally, an instantaneous correction can comprise shifting multiple rows entirely between two successive image frames.

In some examples, the remapping of image rows to display hardware rows is performed for an entire image. In other examples, the remapping of image rows to display hardware rows is performed for a part of an image, such as a determined foveal view region.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
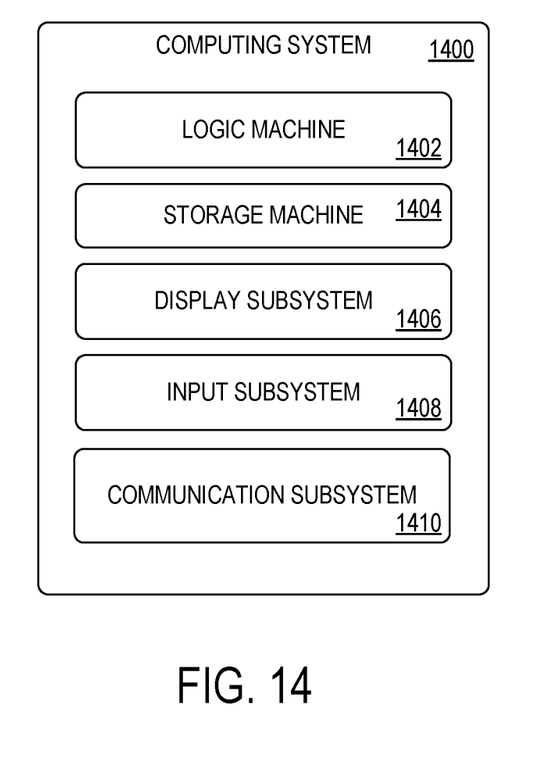
FIG. 14 shows a block diagram of an example computing device.

FIG. 14 schematically shows a non-limiting embodiment of a computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices.

Computing system 1400 includes a logic machine 1402 and a storage machine 1404. Computing system 1400 may optionally include a display subsystem 1406, input subsystem 1408, communication subsystem 1410, and/or other components not shown in FIG. 14.

Logic machine 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1404 includes one or more physical devices configured to hold instructions executable by the logic machine to implement the methods and processes described herein. When such methods and processes are implemented, the state of storage machine 1404 may be transformed—e.g., to hold different data.

Storage machine 1404 may include removable and/or built-in devices. Storage machine 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random-access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1400 implemented to perform a particular function. In some cases, a module, program, or engine may be instantiated via logic machine 1402 executing instructions held by storage machine 1404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1406 may be used to present a visual representation of data held by storage machine 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1400 to send and/or receive messages to and/or from other devices via a network such as the Internet.

Another example provides a head-mounted display device comprising a binocular display system comprising a left eye display and a right eye display, the binocular display system configured to display image content, and a display misalignment detection system. The head-mounted display device further comprises a controller configured to receive a signal from the display misalignment detection system comprising information related to a vertical misalignment between the left eye display and the right eye display, analyze the image content to determine image content information, determine a vertical misalignment correction strategy based at least upon the image content information and the vertical misalignment, and based at least upon the vertical misalignment correction strategy, control the binocular display system to correct the vertical misalignment. In some such examples, the image content information comprises a stimulus size of a virtual object in the image content, and determining the vertical misalignment correction strategy is based at least upon the stimulus size of the virtual object in the image content. In some such examples, the head-mounted display device additionally or alternatively comprises an eye-tracking system, and the controller is configured to use the eye-tracking system to determine a foveal view region and determine the vertical misalignment strategy further based upon whether the virtual object is in a portion of the image content corresponding to the foveal view region. In some such examples, the controller additionally or alternatively is configured to perform a relatively faster vertical misalignment correction based upon a relatively smaller stimulus size of the virtual object, and perform a relatively slower vertical misalignment correction based upon a relatively larger stimulus size of the virtual object. In some such examples, the vertical misalignment correction strategy additionally or alternatively comprises applying a correction at a rate of 1-10 arcminutes per second based upon the stimulus size being larger than a threshold value. In some such examples, the vertical misalignment correction strategy additionally or alternatively comprises applying a correction at a rate of 10 arcminutes per second based or greater upon the stimulus size being smaller than a threshold value. In some such examples, the controller additionally or alternatively is configured to analyze the image content by performing an edge-detecting algorithm on an image frame of the image content to determine one or more edges in the image frame, and determine the stimulus size of the virtual object based at least on a distance between the one or more edges. In some such examples, the image content additionally or alternatively comprises labeled semantic data for one or more virtual objects, and the controller is configured to analyze the image content by determining the stimulus size of the virtual object from the labeled semantic data. In some such examples, the head-mounted display device additionally or alternatively comprises an eye-tracking system, and the controller is configured to receive a signal from the eye-tracking system indicating a vergence plane of a user, and analyze the image content by filtering out image content that is not at the vergence plane. In some such examples, the controller additionally or alternatively is configured to analyze the image content by transforming at least a portion of the image content to a frequency domain, and determine the vertical misalignment correction strategy based at least on a distribution of spatial frequencies in the frequency domain. In some such examples, the controller additionally or alternatively is configured not to correct the vertical misalignment based upon the stimulus size being greater than a threshold value.

Another example provides a method for correcting vertical misalignment in a binocular display system. The method comprises receiving a signal indicating a vertical misalignment between a left eye display and a right eye display of the binocular display system, analyzing image content displayed via the binocular display system to determine a stimulus size of a virtual object in the image content, determining a vertical misalignment correction strategy based at least upon the stimulus size of the virtual object and the vertical misalignment, and based at least upon the vertical misalignment correction strategy, controlling the binocular display system to correct the vertical misalignment. In some such examples, analyzing the image content comprises determining a foveal view region of a user based on gaze location data, and analyzing the image content comprises analyzing a portion of the image content corresponding to the foveal view region to determine the stimulus size of the virtual object. In some such examples, analyzing the image content additionally or alternatively comprises transforming at least a portion of the image content to a frequency domain, and determining the vertical misalignment correction strategy is based at least on a distribution of spatial frequencies in the frequency domain. In some such examples, the method additionally or alternatively comprises not correcting the vertical misalignment based upon the stimulus size being larger than a threshold value. In some such examples, determining the vertical misalignment correction strategy additionally or alternatively comprises performing a relatively faster correction based upon a determination of a relatively smaller stimulus size of the virtual object, or performing a relatively slower vertical misalignment correction based upon a determination of a relatively larger stimulus size of the virtual object.

Another example provides a head-mounted display device, comprising a binocular display system comprising a left eye display and a right eye display, the binocular display system configured to display image content, a display misalignment detection system, and an eye-tracking system. The head-mounted display device further comprises a controller configured to receive a signal from a misalignment detection system comprising information related to vertical misalignment between a left eye display and a right eye display of a binocular display system, receive gaze location data from the eye-tracking system indicating a gaze location for each of one or more eyes of a user, determine a foveal view region based at least on the gaze location data, and analyze image content displayed via the binocular display system to determine a size of a virtual object in the foveal view region. The controller is further configured to, based at least upon the vertical misalignment and the size of the virtual object, determine a vertical misalignment correction strategy, and based upon the vertical misalignment correction strategy, control the binocular display system to correct the vertical misalignment. In some such examples, the image content comprises labeled semantic data for the virtual object, and the controller is configured to analyze the image content by determining the size of the virtual object from the labeled semantic data. In some such examples, the controller additionally or alternatively is configured to perform a relatively faster vertical misalignment correction based upon a relatively smaller size of the virtual object, and perform a relatively slower vertical misalignment correction based upon a relatively larger size of the virtual object. In some such examples, the controller additionally or alternatively is configured to determine a foveal image based on the foveal view region and the image content, analyze the image content by transforming the foveal image to a frequency domain, and determine the vertical misalignment correction strategy based at least on a distribution of spatial frequencies in the frequency domain.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device, comprising:
a binocular display system comprising a left eye display and a right eye display, the binocular display system configured to display image content;
a display misalignment detection system; and
a controller configured to
receive a signal from the display misalignment detection system comprising information related to a vertical misalignment between the left eye display and the right eye display,
analyze the image content to determine a stimulus size of a virtual object in the image content,
determine a vertical misalignment correction strategy based at least upon the stimulus size of the virtual object and the vertical misalignment, and
based at least upon the vertical misalignment correction strategy, control the binocular display system to correct the vertical misalignment.

2. The head-mounted display device of claim 1, further comprising an eye-tracking system, wherein the controller is configured to use the eye-tracking system to determine a foveal view region, and determine the vertical misalignment strategy further based upon whether the virtual object is in a portion of the image content corresponding to the foveal view region.

3. The head-mounted display device of claim 1, wherein the controller is configured to perform a relatively faster vertical misalignment correction based upon a relatively smaller stimulus size of the virtual object, and perform a relatively slower vertical misalignment correction based upon a relatively larger stimulus size of the virtual object.

4. The head-mounted display device of claim 3, wherein the vertical misalignment correction strategy comprises applying a correction at a rate of 1-10 arcminutes per second based upon the stimulus size being larger than a threshold value.

5. The head-mounted display device of claim 3, wherein the vertical misalignment correction strategy comprises applying a correction at a rate of 10 arcminutes per second based or greater upon the stimulus size being smaller than a threshold value.

6. The head-mounted display device of claim 1, wherein the controller is configured to analyze the image content by performing an edge-detecting algorithm on an image frame of the image content to determine one or more edges in the image frame, and determine the stimulus size of the virtual object based at least on a distance between the one or more edges.

7. The head-mounted display device of claim 1, wherein the image content comprises labeled semantic data for one or more virtual objects, and the controller is configured to analyze the image content by determining the stimulus size of the virtual object from the labeled semantic data.

8. The head-mounted display device of claim 1, further comprising an eye-tracking system, wherein the controller is configured to receive a signal from the eye-tracking system indicating a vergence plane of a user, and analyze the image content by filtering out image content that is not at the vergence plane.

9. The head-mounted display device of claim 1, wherein the controller is configured to analyze the image content by transforming at least a portion of the image content to a frequency domain, and determine the vertical misalignment correction strategy based at least on a distribution of spatial frequencies in the frequency domain.

10. The head-mounted display device of claim 1, wherein the controller is further configured not to correct the vertical misalignment based upon the stimulus size being greater than a threshold value.

11. A method for correcting vertical misalignment in a binocular display system, the method comprising:
receiving a signal indicating a vertical misalignment between a left eye display and a right eye display of the binocular display system;
analyzing image content displayed via the binocular display system to determine a stimulus size of a virtual object in the image content;
determining a vertical misalignment correction strategy based at least upon the stimulus size of the virtual object and the vertical misalignment; and
based at least upon the vertical misalignment correction strategy, controlling the binocular display system to correct the vertical misalignment.

12. The method of claim 11, wherein analyzing the image content comprises determining a foveal view region of a user based on gaze location data, and analyzing the image content comprises analyzing a portion of the image content corresponding to the foveal view region to determine the stimulus size of the virtual object.

13. The method of claim 11, wherein analyzing the image content comprises transforming at least a portion of the image content to a frequency domain, and determining the vertical misalignment correction strategy is based at least on a distribution of spatial frequencies in the frequency domain.

14. The method of claim 11, further comprising not correcting the vertical misalignment based upon the stimulus size being larger than a threshold value.

15. The method of claim 11, wherein determining the vertical misalignment correction strategy comprises performing a relatively faster correction based upon a determination of a relatively smaller stimulus size of the virtual object, or performing a relatively slower vertical misalignment correction based upon a determination of a relatively larger stimulus size of the virtual object.

16. A head-mounted display device, comprising:
a binocular display system comprising a left eye display and a right eye display, the binocular display system configured to display image content;
a display misalignment detection system;
an eye-tracking system; and
a controller configured to
receive a signal from a misalignment detection system comprising information related to vertical misalignment between a left eye display and a right eye display of a binocular display system,
receive gaze location data from the eye-tracking system indicating a gaze location for each of one or more eyes of a user,
determine a foveal view region based at least on the gaze location data,
analyze image content displayed via the binocular display system to determine a size of a virtual object in the foveal view region,
based at least upon the vertical misalignment and the size of the virtual object, determine a vertical misalignment correction strategy, and
based upon the vertical misalignment correction strategy, control the binocular display system to correct the vertical misalignment.

17. The head-mounted display device of claim 16, wherein the image content comprises labeled semantic data for the virtual object, and the controller is configured to analyze the image content by determining the size of the virtual object from the labeled semantic data.

18. The head-mounted display device of claim 16, wherein the controller is configured to perform a relatively faster vertical misalignment correction based upon a relatively smaller size of the virtual object, and perform a relatively slower vertical misalignment correction based upon a relatively larger size of the virtual object.

19. The head-mounted display device of claim 16, wherein the controller is configured to determine a foveal image based on the foveal view region and the image content, analyze the image content by transforming the foveal image to a frequency domain, and determine the vertical misalignment correction strategy based at least on a distribution of spatial frequencies in the frequency domain.

* * * * *